(12) United States Patent
Park et al.

(10) Patent No.: US 12,462,465 B2
(45) Date of Patent: Nov. 4, 2025

(54) RAY TRACING DEVICE AND METHOD WITH IMPROVED PERFORMANCE

(71) Applicant: SiliconArts Technology US Inc., Waco, TX (US)

(72) Inventors: Woo Chan Park, Seoul (KR); Tae Hyoung Lee, Seoul (KR)

(73) Assignee: SiliconArts Technology US Inc.

( * ) Notice: Subject to any disclaimer, the term of this patent is extended or adjusted under 35 U.S.C. 154(b) by 271 days.

(21) Appl. No.: 18/031,687

(22) PCT Filed: Dec. 1, 2020

(86) PCT No.: PCT/KR2020/017368
§ 371 (c)(1),
(2) Date: Apr. 13, 2023

(87) PCT Pub. No.: WO2022/080580
PCT Pub. Date: Apr. 21, 2022

(65) Prior Publication Data
US 2023/0410408 A1 Dec. 21, 2023

(30) Foreign Application Priority Data
Oct. 13, 2020 (KR) .......................... 10-2020-0132046

(51) Int. Cl.
*G06T 15/06* (2011.01)
*G06T 17/00* (2006.01)
(52) U.S. Cl.
CPC ............ *G06T 15/06* (2013.01); *G06T 17/005* (2013.01)

(58) Field of Classification Search
None
See application file for complete search history.

(56) References Cited

U.S. PATENT DOCUMENTS

2013/0314420 A1* 11/2013 Yoon ................. G06T 15/06
  345/426
2017/0024924 A1   1/2017 Wald et al.
2018/0300941 A1  10/2018 Akenine-Moller

FOREIGN PATENT DOCUMENTS

| KR | 10-2012-0092926 A | 8/2012 |
| KR | 10-2015-0039493 A | 4/2015 |
| KR | 10-2080851 B1 | 2/2020 |
| WO | WO 2016/027912 A1 | 2/2016 |

OTHER PUBLICATIONS

International Search Report for PCT/KR2020/017368 mailed Jul. 6, 2021 from Korean Intellectual Property Office.

* cited by examiner

*Primary Examiner* — Nurun Flora
(74) *Attorney, Agent, or Firm* — BROADVIEW IP LAW, PC (57) ABSTRACT

There is provided a ray tracing device with improved performance. The ray tracing device includes a tree build unit (TBU) building a spatial partitioning structure; a ray tracing unit (RTU) performing ray tracing based on the spatial partitioning structure; and a controller controlling the balance between operating performances of the tree build unit and the ray tracing unit adaptively by monitoring load conditions of the corresponding units.

13 Claims, 6 Drawing Sheets

RAY TRACING DEVICE AND METHOD WITH IMPROVED PERFORMANCE

CROSS-REFERENCE TO PRIOR APPLICATIONS

This application is a National Stage Patent Application of PCT International Patent Application No. PCT/KR2020/017368 (filed on Dec. 1, 2020) under 35 U.S.C. § 371, which claims priority to Korean Patent Application No. 10-2020-0132046 (filed on Oct. 13, 2020), which are all hereby incorporated by reference in their entirety.

ACKNOWLEDGEMENT

National research and development project that supported this invention
Project unique number: 1711116243
Project number: 2016-0-00312-005
Department: Ministry of Science and ICT
Project management (Professional) Institute: Institute of Information & Communication Technology Planning & Evaluation
Research Project Name: Fostering Innovative Talents in Information Communication and Broadcasting (R&D)
Research Title: Mobile platform-based entertainment VR technology research
Contribution rate: 1/1
Name of project performing organization: Sejong University Industry Foundation
Research period: 2020.01.01~2021.12.31

BACKGROUND

The present disclosure relates to a three-dimensional (3D) graphics processing technology. More particularly, the present disclosure relates to a ray tracing device and method with improved performance capable of improving the overall image processing performance by adjusting an acceleration structure build process employing a tree structure and a ray tracing process to have comparable performances to each other.

3D graphics technology is a branch of graphics technology that uses a 3D representation of geometric data stored in a computing device and is widely used today in various industries, including media and game industries. In general, 3D graphics technology requires a separate high-performance graphics processor due to a large amount of computation.

Along with advances in the processors, research has been underway to develop ray tracing technology that may generate photo-realistic 3D graphics.

Ray tracing technology relates to a rendering method based on global illumination. Ray tracing technology generates realistic 3D images by providing reflection, refraction, and shadow effects in a natural manner by simulating the effect of light reflected or refracted from another object on the image of a target object.

PRIOR ART REFERENCES

Patents

Korea laid-open patent 10-2015-0039493 (2015 Apr. 10)

SUMMARY

An object according to one embodiment of the present disclosure is to provide a ray tracing device and method with improved performance capable of improving the overall image processing performance by adjusting an acceleration structure build process employing a tree structure and a ray tracing process to have comparable performances to each other.

Another object according to one embodiment of the present disclosure is to provide a ray tracing device and method with improved performance capable of preventing shortages or waste of resources by monitoring a ray tracing process and selectively controlling operating performance according to load conditions of units.

A ray tracing device with improved performance according to the embodiments comprises a tree build unit (TBU) building a spatial partitioning structure; a ray tracing unit (RTU) performing ray tracing based on the spatial partitioning structure; and a controller controlling the balance between operating performances of the tree build unit and the ray tracing unit adaptively by monitoring load conditions of the corresponding units.

The load condition may be determined based on a frame rate at which frames are processed in each of the corresponding units.

The spatial partitioning structure may include a bounding volume hierarchy (BVH) and a K-dimensional (KD) tree.

The operating performance of the tree build unit may change according to the maximum primitive number of a leaf node and/or tree depth in the structure of the BVH or the KD tree.

The operating performance of the ray tracing unit may change according to at least one of the ray bounces of ray tracing, the number of shootings of a shadow ray, the number of lights, the anti-aliasing level, and the number of samplings per pixel.

The controller may generate a control parameter for adjusting the operating performance of at least one of the tree build unit and the ray tracing unit according to a comparison of loads of the tree build unit and the ray tracing unit.

When the load of the ray tracing unit is greater than the load of the tree build unit, the controller may control the operating performance of the tree build unit to reduce the complexity of the spatial partitioning structure by increasing the maximum number of primitives and/or decreasing the tree depth.

When the load of the ray tracing unit is smaller than the load of the tree build unit, the controller may control the operating performance of the ray tracing unit to lower rendering quality.

The controller may generate the control parameter using a first parameter related to at least one of reducing ray bounces, reducing the number of shootings of a shadow ray, reducing the number of lights, reducing the anti-aliasing level, and reducing the number of samplings per pixel as a first method for lowering the rendering quality.

The controller may determine the total reduction amount according to a load difference between the corresponding units; when a plurality of the first method are selected, the controller may generate the first parameter by distributing the total reduction amount differently among the corresponding methods according to preset priorities.

The controller may generate the control parameter using a second parameter related to any one of expansion of a gaze-sensitive area, expansion of a peripheral area, and an increase in a color difference as a second method for lowering the rendering quality.

A ray tracing method with improved performance according to embodiments comprises building a spatial partitioning structure by the tree build unit; performing ray tracing based on the spatial partitioning structure by the ray tracing unit; and controlling the balance between operating performances of the tree build unit and the ray tracing unit adaptively by monitoring load conditions of the corresponding units by the controller.

The controlling may include checking a frame processing rate of the ray tracing unit; checking a frame processing rate of the tree build unit; calculating a frame rate per unit time from the number of frames processed by the ray tracing unit and the number of frames processed by the tree build unit; and determining the load conditions based on the calculated frame rate.

The present disclosure may provide the following effects. However, since it is not meant that a specific embodiment has to provide all of or only the following effects, the technical scope of the present disclosure should not be regarded as being limited by the specific embodiment.

A ray tracing device and method with improved performance according to one embodiment of the present disclosure may improve the overall image processing performance by adjusting an acceleration structure build process employing a tree structure and a ray tracing process to have comparable performances to each other.

A ray tracing device and method with improved performance according to one embodiment of the present disclosure may prevent shortages or waste of resources by monitoring a ray tracing process and selectively controlling operating performance according to load conditions of units.

DETAILED DESCRIPTION

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices storing data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

Figure 1:
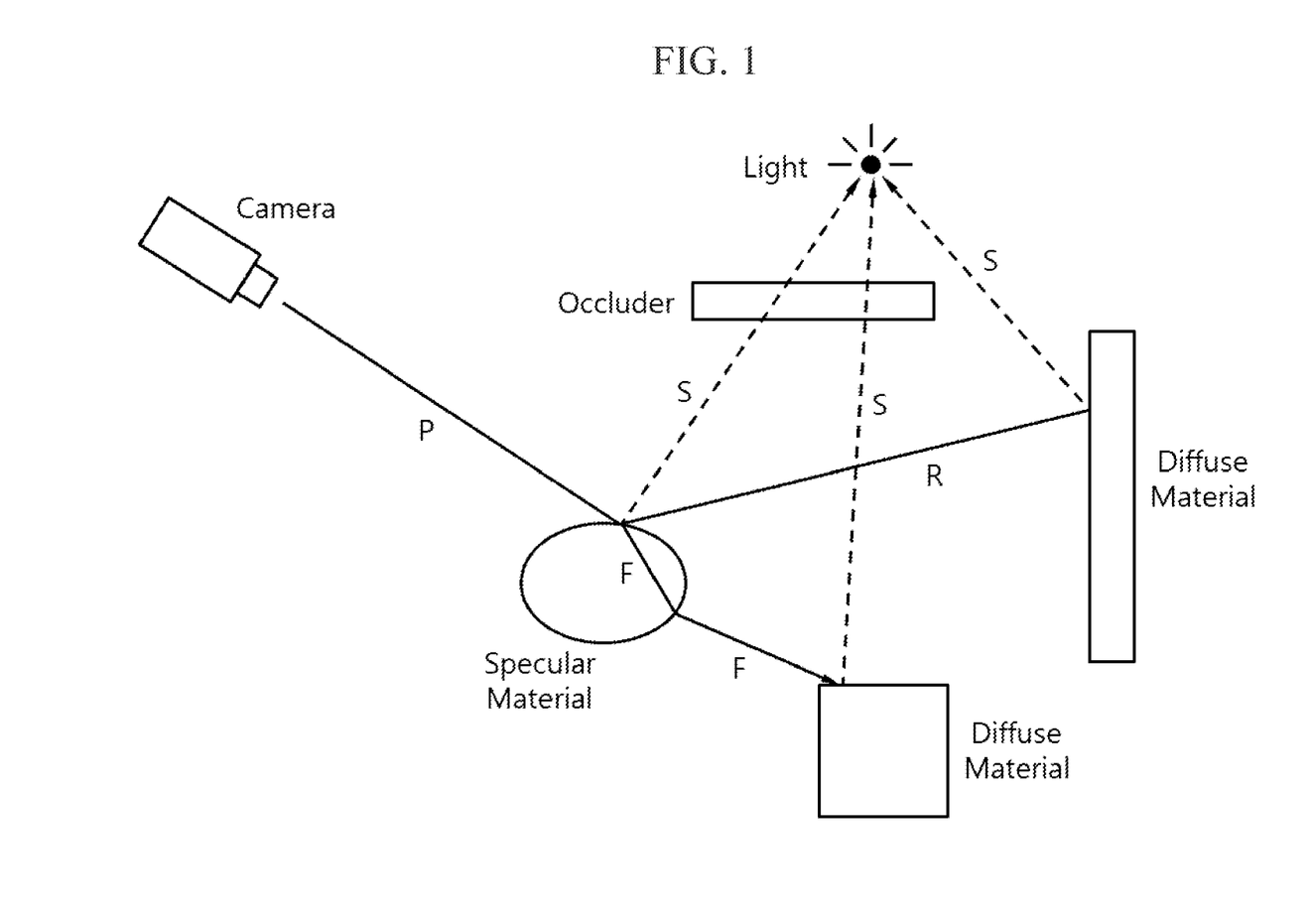
FIG. 1 shows one embodiment of a ray tracing process.

FIG. 1 shows one embodiment of a ray tracing process.
Referring to FIG. 1, a ray tracing method performed in a ray tracing device may correspond to a rendering method according to global illumination. The use of global illumination-based rendering may imply that light reflected or refracted from other objects also affects the image of a target object. As a result, realistic 3D images may be generated since reflection, refraction, and shadow effects are realized in a natural manner.

The ray tracing device may first generate a primary ray P from a camera position per pixel and perform calculations to find an object that intersects the ray. The ray tracing device may generate a reflection ray R for a reflection effect or a refraction ray F for a refraction effect at the intersection point where the ray and the object meet if the object hit by the ray has a reflection or refraction property; for a shadow effect, the ray tracing device may generate a shadow ray S in the direction of light.

Here, if the shadow ray directed to the corresponding light and an object meet, a shadow is created; otherwise, no shadow is created. The reflected ray and the refracted ray are called secondary rays, and the ray tracing device may perform calculations for each ray to find an object that intersects the ray. The ray tracing device may perform the above process recursively.

Figure 2:
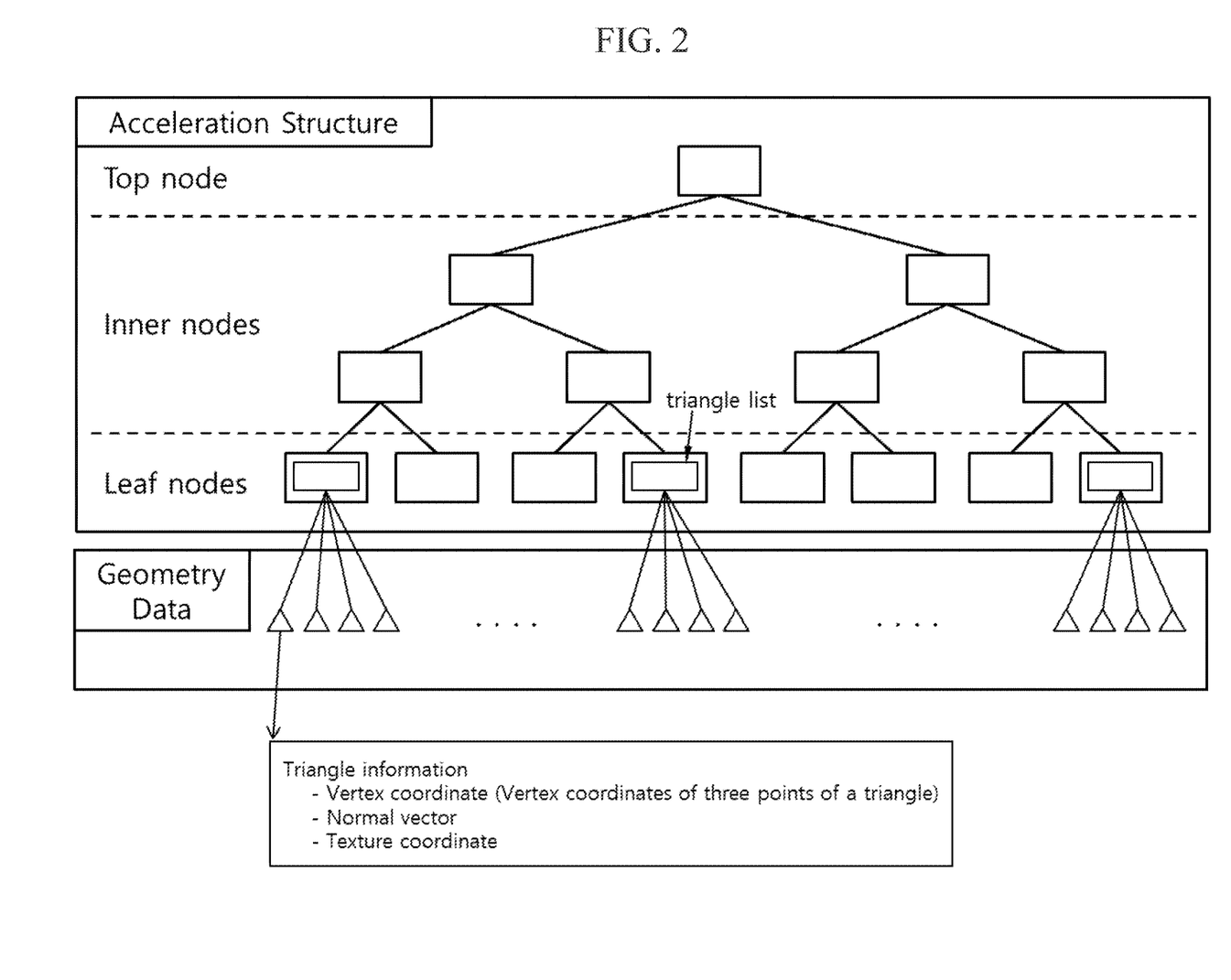
FIG. 2 shows one embodiment of a KD tree as an acceleration structure used in a ray tracing process.

FIG. 2 shows one embodiment of a KD tree as an acceleration structure used in a ray tracing process.

Referring to FIG. 2, to perform ray tracing, an acceleration structure (AS), such as a KD tree or a Bounding Volume Hierarchy (BVH), generated based on the entire geometry data (consisting of the coordinates of triangles) is essential. Therefore, it is necessary to build an AS before performing ray tracing. Since building such an acceleration structure requires a lot of computation, it may take considerable time.

FIG. 2 illustrates the overall structure of a KD tree. The KD tree may correspond to a binary tree having a hierarchical structure for a partitioned space. A KD tree may consist of inner nodes (including the top node) and leaf nodes, and a leaf node may correspond to a space containing objects that intersect with the corresponding node. In other words, the KD tree is a spatial partitioning tree and may correspond to one of the spatial partitioning structures.

On the other hand, an inner node may occupy a bounding box-based spatial area, and the corresponding spatial area may be split into two areas and assigned to two lower nodes. As a result, an inner node may consist of a splitting plane and a sub-tree of two areas partitioned by the splitting plane, and a leaf node may contain only a series of triangles. For example, a leaf node may include a triangle list for pointing to at least one triangle information included in geometric data; the triangle information may include vertex coordinates for three points of the triangle, normal vectors, and/or texture coordinates. If triangle information in the geometric data is implemented as an array, the triangle list in a leaf node may correspond to the array index.

On the other hand, the space-partitioning position p may correspond to the point where the cost (the number of node visits, the number of times for calculating whether a ray intersects a triangle, and so on) to find a triangle that hits an arbitrary ray is minimized; the most popular method used to find the corresponding position p may be the surface area heuristic (SAH).

Figure 3:
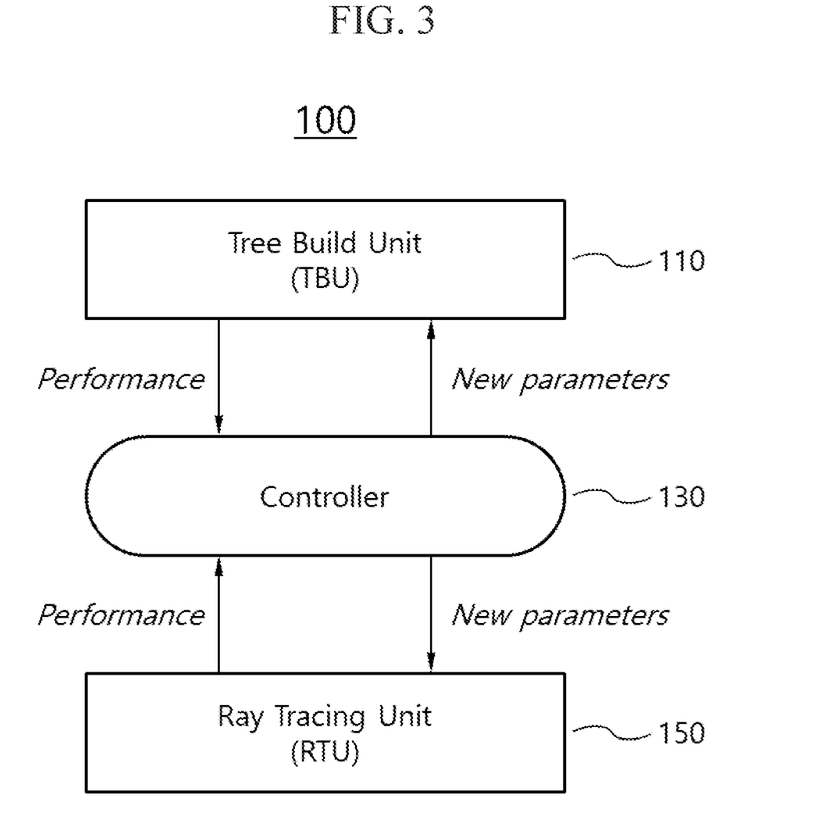
FIG. 3 is a block diagram illustrating a ray tracing device according to the present disclosure.

FIG. 3 is a block diagram illustrating a ray tracing device according to the present disclosure.

Referring to FIG. 3, the ray tracing device 100 may include a tree build unit (TBU) 110, a controller 130, and a ray tracing unit (RTU) 150. The ray tracing device 100 may include graphics processor hardware capable of processing ray tracing for a dynamic scene in real-time and may perform load balancing between the tree build unit 110 and the ray tracing unit 150 dynamically.

The tree build unit 110 may perform the operation of building a spatial partitioning structure. For example, the tree build unit 110 may generate an acceleration structure, such as a Bounding Volume Hierarchy (BVH) or a K-Dimensional Tree (KD tree), based on the entire geometry data stored in an external memory.

More specifically, the tree build unit 110 may build an acceleration structure for a static scene and a dynamic scene required for a ray tracing process according to the operation of an application such as a 3D game engine. Here, in the case of a static scene, a static acceleration structure (AS) may be created through a single execution of a tree build when a 3D application is run; in the case of a dynamic scene, primitive information changes every frame, and thus, a tree build is performed for every frame to create a dynamic AS. The static and dynamic acceleration structures generated by the tree build unit 110 may be stored in an external memory and used in a subsequent ray tracing process.

Also, the tree build unit 110 may operate by dynamically adjusting its performance under the control of the controller 130. In one embodiment, the operating performance of the tree build unit 110 may change according to the maximum primitive number of a leaf node and/or tree depth in the structure of the BVH or the KD tree.

For example, if the maximum primitive number of a leaf node is increased or the total tree depth is lowered under the control of the controller 130, the quality of the acceleration structure (AS) deteriorates; however, the processing speed of the tree build unit 110, namely, the operating performance, may be improved.

As another example, if the maximum primitive number of a leaf node is reduced or the total tree depth is increased under the control of the controller 130, the quality of the acceleration structure (AS) may be improved; however, the processing speed of the tree build unit 110, namely, the operating performance, may be degraded. Accordingly, the quality of a constructed spatial partitioning structure may be determined according to the operating performance of the tree build unit 110.

The ray tracing unit 150 may perform ray tracing based on a spatial partitioning structure. More specifically, the ray tracing unit 150 may perform ray tracing using the dynamic and static acceleration structures generated by the tree build unit 110, and each of the dynamic and static acceleration structures may be stored in an external memory.

Also, the ray tracing unit 150 may operate by dynamically adjusting performance according to the control of the controller 130. In one embodiment, the operating performance of the ray tracing unit 150 may change according to at least one of the ray bounces of ray tracing, the number of shootings of a shadow ray, the number of lights, the anti-aliasing level, and the number of samplings per pixel. In other words, the operating performance of the ray tracing unit 150 may be changed according to rendering quality; the operating performance may also be changed according to rendering techniques such as expansion of a gaze-sensitive area or peripheral area and an increase in a color difference.

The controller 130 may control the balance between operating performances of the tree build unit 110 and the ray tracing unit 150 adaptively by monitoring load conditions of the corresponding units. In other words, the controller 130 may control the operating performances of the tree build unit 110 and the ray tracing unit 150 dynamically by receiving the performances of the tree build unit 110 and the ray tracing unit 150 and adjusting the quality of the acceleration structure of the tree build unit 110 or the rendering quality of the ray tracing unit 150. For example, the load condition may be determined based on a frame rate at which frames are processed by the tree build unit 110 and/or the ray tracing unit 150.

Figure 4:
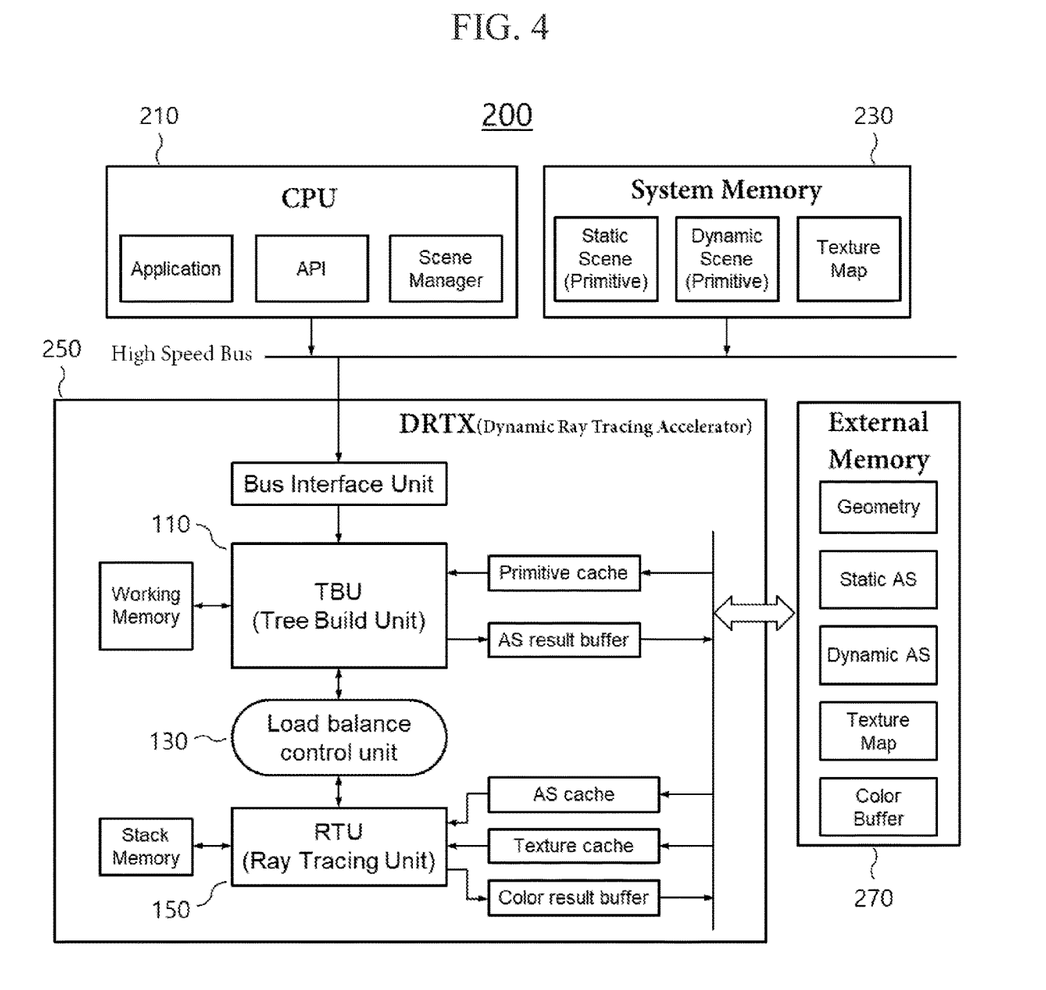
FIG. 4 is a block diagram illustrating a ray tracing system including the ray tracing device of FIG. 1.

FIG. 4 is a block diagram illustrating a ray tracing system including the ray tracing device of FIG. 1.

Referring to FIG. 4, the ray tracing system 200 may include a central processing unit (CPU) 210, a system memory 230, a dynamic ray tracing accelerator (DRTX) 250, and an external memory 270.

The CPU 210 may process 3D applications, which may include an application such as a 3D game engine, application programming interfaces (APIs), and/or a scene manager.

The system memory 230 may store graphics data information required for a 3D application and may include a PSS area storing primitive static scenes, a PDS area storing primitive dynamic scenes, and/or a texture map area storing a MIP-MAP for texture mapping.

The DRTX 250 may be implemented by including the ray tracing device 100 of FIG. 3 as one constituting element, which may further include a bus interface unit, an AS result buffer, a primitive cache, a working memory, an AS cache, a texture cache, a color result buffer, and/or a stack memory.

The primitive cache may perform the operation of delivering a primitive scene to the tree build unit 110, and the AS result buffer may perform the operation of receiving a processing result of a primitive scene from the tree build unit 110 and delivering the received processing result to the external memory 270. Also, the AS cache may perform the operation of delivering tree build information on a primitive scene processed by the tree build unit 110 to the ray tracing unit 150, the texture cache may perform the operation of delivering texture to the ray tracing unit 150, and the color result buffer may perform the operation of receiving a processing result of performing ray tracing from the ray tracing unit 150 and delivering the received processing result to the external memory 270.

In one embodiment, the DRTX 250 may construct a spatial partitioning structure based on the graphics data information, perform ray tracing based on the generated spatial partitioning structure, send the result of ray tracing performed to the CPU 210, and adjust the tree build unit 110 and the ray tracing unit 150 to have comparable operating performances by monitoring the ray tracing speed.

In other words, the overall performance of ray tracing performed by the DRTX 250 may be determined by the lowest performance between the tree build unit 110 and the ray tracing unit 150. For example, when the tree build unit 110 exhibits lower performance than the ray tracing unit 150, the frame rate of a final output image may depend on the performance of the tree build unit 110, and the frame rate may depend on the performance of the ray tracing unit 150 in the opposite case. The controller 130 of the DRTX 250 may operate to adaptively adjust the performances of the corresponding units and may manage parameter values related to the operating performances.

The external memory 270 may temporarily store the information processed by the DRTX 250 and may include a geometry information storage area, a static AS storage area, a dynamic AS storage area, a texture map storage area, and/or a color buffer storage area.

Figure 5:
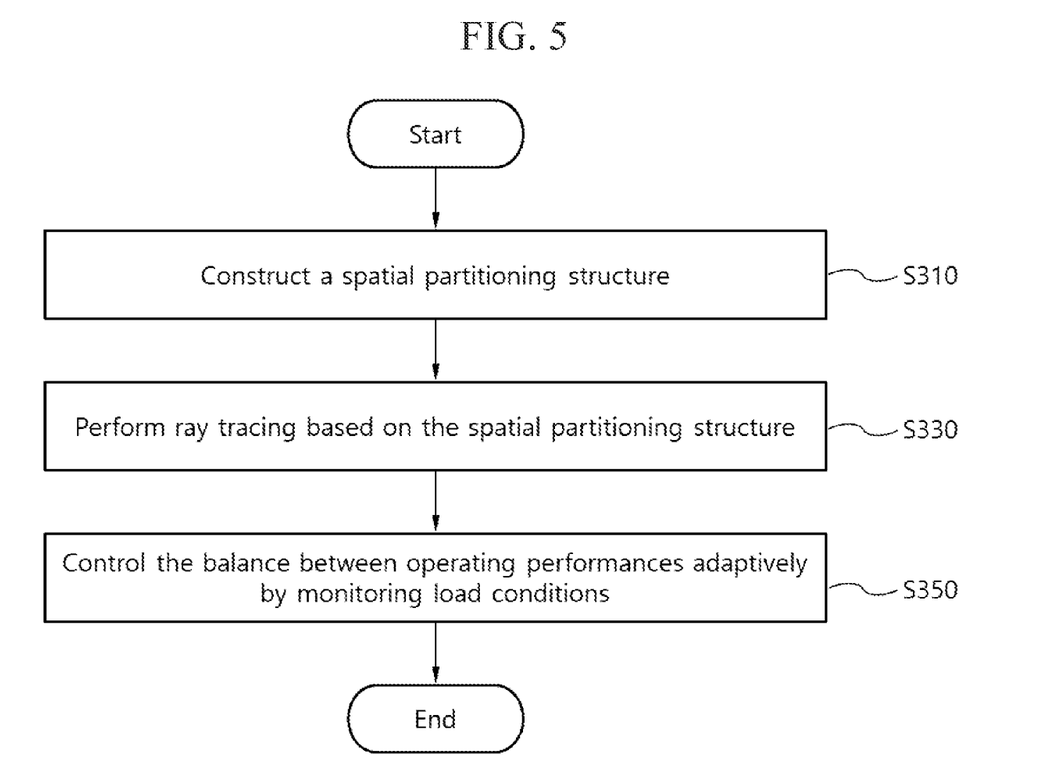
FIG. 5 is a flow diagram illustrating a ray tracing method performed in FIG. 1.

FIG. 5 is a flow diagram illustrating a ray tracing method performed in FIG. 1.

Referring to FIG. 5, the ray tracing device 100 may construct a spatial partitioning structure through the tree build unit 110 S310. The ray tracing device 100 may perform ray tracing based on the spatial partitioning structure through the ray tracing unit 150 S330.

Also, the ray tracing device 100 may control the balance between operating performances of the tree build unit 110 and the ray tracing unit 150 adaptively by monitoring load conditions of the corresponding units through the controller 130 S350. More specifically, when the load of the ray tracing unit 150 is greater than the load of the tree build unit 110, the controller 130 may control the operating performance of the tree build unit 110 to reduce the complexity of the spatial partitioning structure. For example, the complexity of the spatial partitioning structure may be reduced by an increase in the maximum primitive number and/or a decrease in the tree depth, and the controller 130 may generate control parameters related to manipulating the complexity and provide the generated control parameters to the tree build unit 110.

When the load of the ray tracing unit 150 is smaller than the load of the tree build unit 110, the controller 130 may control the operating performance of the ray tracing unit 150 to lower rendering quality. For example, a first method for lowering the rendering quality may include reducing ray bounces, reducing the number of shootings of a shadow ray, reducing the number of lights, reducing the anti-aliasing level, and reducing the number of samplings per pixel.

More specifically, ray tracing may recursively perform reflection, refraction, and penetration and generate a new ray for each iteration. At this time, as the number of ray bounces increases, image quality improves, while processing performance may deteriorate. A method of reducing ray bounces of ray tracing may be used when the performance of the ray tracing unit 150 becomes lower than that of the tree build unit 110. In other words, the controller 130 may generate a control parameter to reduce the maximum number of ray bounces currently set for the ray tracing unit 150 and deliver the maximum number of ray bounces to the ray tracing unit 150; the ray tracing unit 150 may perform ray tracing based on the corresponding information and provide information on the operating performance to the controller 130.

Also, when a primary ray or a secondary ray hits an object in the ray tracing process, a shadow ray may be shot from the hit point for each light. In the case of area light, a plurality of shadow rays may be shot for each light. A method of reducing the number of shootings of a shadow ray may be used when the performance of the ray tracing unit 150 is lower than that of the tree build unit 110. In other words, the controller 130 may generate a control parameter to reduce the number of lights shooting the shadow light or reduce the number of shadow rays in the case of area light and deliver the generated control parameter to the ray tracing unit 150; the ray tracing unit 150 may then perform ray tracing based on the corresponding information and deliver the information on the operating performance to the controller 130. At this time, the light that does not shoot a shadow ray may be treated as being not a shadow ray; the priority of lights for shooting a shadow ray may be determined in advance based on their influence on image quality, with more influential lights given higher priority.

Also, as the number of lights increases, the number of shadow rays increases, and shading operations are also performed multiple times, which enhances image quality but results in performance degradation of the ray tracing unit 150. A method of reducing the number of lights may be used when the performance of the ray tracing unit 150 is lower than that of the tree build unit 110. In other words, the controller 130 may generate a control parameter to reduce the number of lights and deliver the generated control parameter to the ray tracing unit 150; the ray tracing unit 150 may then perform ray tracing based on the corresponding information and deliver the information related to the operating performance to the controller 130. At this time, the priority of lights may be determined in advance according to their influence on the image quality, with less influential lights given higher priority.

Also, ray tracing generally processes one primary ray for each pixel; in the case of global illumination, however, a few to several thousand rays for sampling may be processed for each pixel. Global illumination may tend to generate noise as sampling is applied less frequently. A method of reducing the number of sampling applications per pixel may be used when the performance of the ray tracing unit 150 is lower than that of the tree build unit 110. In other words, the controller 130 may generate a control parameter to reduce the number of sampling applications per pixel and deliver the generated control parameter to the ray tracing unit 150; the ray tracing unit 150 may then perform ray tracing based on the corresponding information and provide information on the operating performance to the controller 130.

Also, a method of up-sampling a low-resolution image into a high-resolution image through a scaler or an image processing technique may be used to increase performance at the cost of somewhat deteriorated image quality; the method may be used, in particular, when the performance of the ray tracing unit 150 is lower than that of the tree build unit 110. In other words, the controller 130 may generate a control parameter to perform ray tracing at a low resolution and deliver the generated control parameter to the ray tracing unit 150; the ray tracing unit 150 may then perform ray tracing based on the corresponding information and deliver information on the operating performance to the controller 130. In this case, the ray tracing unit 150 may process up-sampling based on image processing and artificial intelligence (AI) techniques through a separate processing module.

In another example, a second method for lowering rendering quality may include expanding a gaze-sensitive area, expanding a peripheral area, and increasing a color difference. More specifically, the ray tracing unit 150 may perform a related operation by utilizing rendering techniques for reducing the deterioration of image quality while increasing operating performance. For example, the ray tracing unit 150 may use a technique that improves performance by reducing the sampling of areas less sensitive to gaze. When the performance of the ray tracing unit 150 is lower than that of the tree build unit 110, the controller 130 may generate a control parameter to enlarge an area less sensitive to gaze and deliver the generated control parameter to the ray tracing unit 150. The ray tracing unit 150 may then perform ray tracing based on the corresponding information and deliver information on the operating performance to the controller 130.

Also, the ray tracing unit 150 may use a foveated rendering technique that performs more sampling in the central portion of a scene on which gaze is focused and less sampling toward the peripheral area. When the performance of the ray tracing unit 150 is lower than that of the tree build unit 110, the controller 130 generates a control parameter to make the central portion of the scene smaller and enlarge the peripheral area and deliver the generated control parameter to the ray tracing unit 150. The ray tracing unit 150 may then perform ray tracing based on the corresponding information and deliver information on the operating performance to the controller 130.

Also, the ray tracing unit 150 may use a technique of first rendering a scene at a resolution lower than a target resolution, performing sampling or interpolation based on color differences, and generating a scene at a final target resolution. When the performance of the ray tracing unit 150 is lower than that of the tree build unit 110, the controller 130 may generate a control parameter to increase the portion for interpolation by increasing a numeric value that determines the degree of color difference and provide the generated control parameter to the ray tracing unit 150. The ray tracing unit 150 may perform ray tracing based on the corresponding information and provide information on the operating performance to the controller 130.

In one embodiment, the controller 130 may generate a control parameter through a method that determines the total amount of reduction related to rendering quality according to the load difference between the tree build unit 110 and the ray tracing unit 150 and, when a plurality of a first method applied to a rendering quality control process are selected, distributes the total amount of reduction differently among the corresponding methods according to their preset priorities. Through the operation above, the controller 130 may generate a first parameter for controlling the operating performance of the ray tracing unit 150 to lower the rendering quality and may provide the generated first parameter to the ray tracing unit 150.

For example, as the load difference between the tree build unit 110 and the ray tracing unit 150 grows, the total amount of reduction related to the rendering quality may increase. If the total amount of reduction is determined to be 10, and a total of three first methods applied to the rendering quality control process are selected (e.g., methods A, B, and C), the total amount of reduction may be distributed differently among the methods by a ratio of 5:3:2 according to preset priorities (e.g., priorities are in the order of B, A, and C). In other words, a parameter value for method A may be determined to reduce the rendering quality by 3, a parameter value for method B may be determined to reduce the rendering quality by 5, and a parameter value for method C may be determined to reduce the rendering quality by 2, where a control parameter may be finally generated by combining parameter values to be determined for the corresponding methods.

Figure 6:
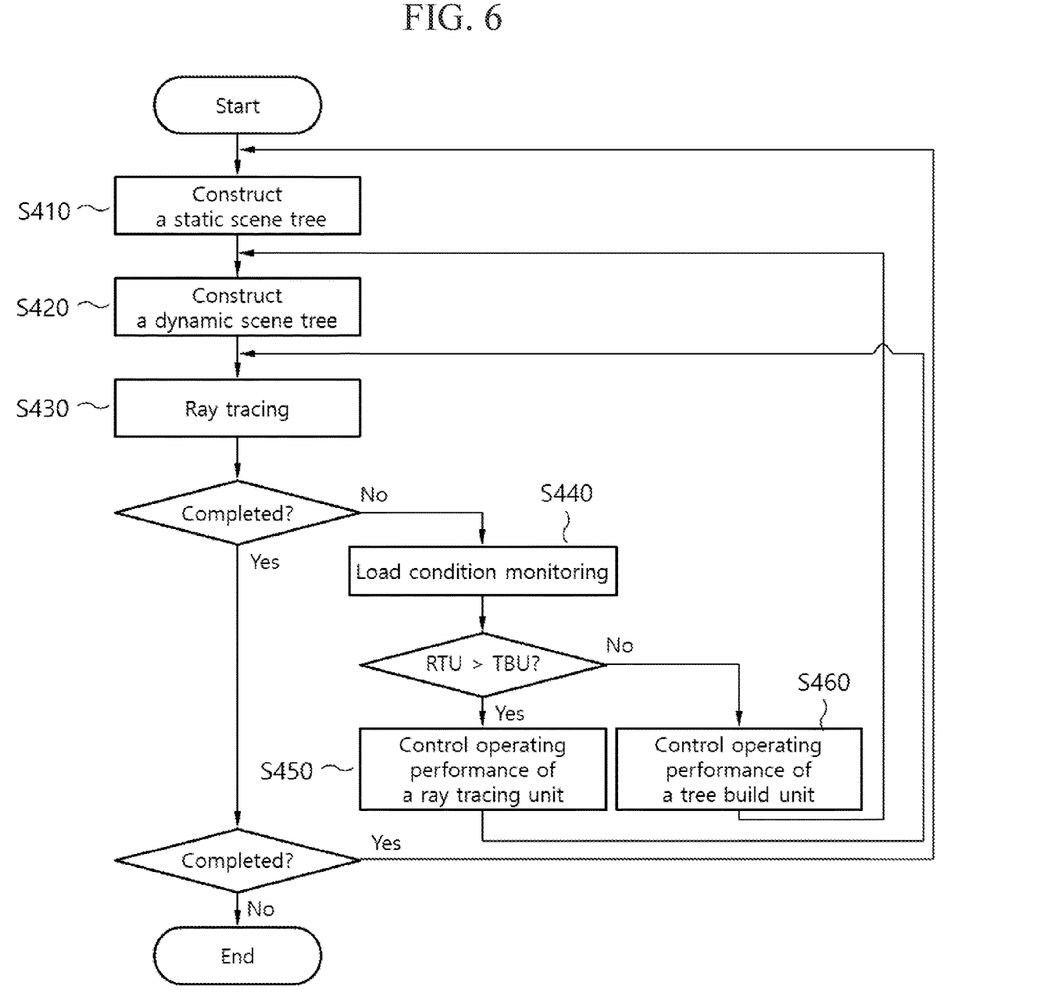
FIG. 6 is a flow diagram illustrating a specific example of FIG. 5.

FIG. 6 is a flow diagram illustrating a specific example of FIG. 5.

Referring to FIG. 6, when the application of the CPU 210 is activated, the scene manager may perform pre-processing that stores a static scene, a dynamic scene, and a texture map in the respective areas of the system memory 230 through an API. In one embodiment, the CPU 210, the system memory 230, and the DRTX 250 may transmit data through a high-speed bus.

The DRTX 250 may transmit a static scene stored in the system memory 230 to the tree build unit 110 through a bus interface unit, and the tree build unit 110 may construct a tree for the static scene S410, where the constructed static scene tree structure may be stored in the static AS storage area of the external memory 270 through an AS result buffer.

Also, the DRTX 250 may transmit a dynamic scene stored in the system memory 230 to the tree build unit 110 through the bus interface unit, and the tree build unit 110 constructs a tree for the dynamic scene S420, where the constructed dynamic scene tree structure may be stored in the dynamic AS storage area of the external memory 270 through the AS result buffer.

Also, while storing the static scene tree structure and the dynamic scene tree structure in the external memory 270, the DRTX 250 may store geometric information of each structure in the geometry storage area of the external memory 270. Also, the DRTX 250 may operate in conjunction with a working memory during the process of generating a tree structure for each scene.

The ray tracing unit 150 may perform ray tracing by retrieving a static scene tree structure and a dynamic scene tree structure stored in the external memory 270 through an acceleration structure (AS) cache S430. For example, the ray tracing unit 150 may perform ray tracing using a stack memory. In one embodiment, a texture map stored in the texture map area of the system memory 230 may be stored in the texture map storage area of the external memory 270 and then transmitted to the ray tracing unit 150 through the texture cache if needed.

Also, when a 3D application does not terminate and continues to perform ray tracing, the controller 130 may monitor load conditions of the tree build unit 110 and the ray tracing unit 150 S440. In one embodiment, the controller 130 may sequentially check the frame processing speed of the tree build unit 110 and the frame processing speed of the ray tracing unit 150; calculate a frame rate at which frames are processed by the tree build unit 110 and a frame rate at which frames are processed by the ray tracing unit 150; and determine the load conditions based on the calculated frame rate.

Also, when the performance of the ray tracing unit 150 is higher than that of the tree build unit 110, the control unit 130 may determine that the tree build unit 110 is heavily loaded and, to reduce the load of the tree build unit 110, may control the tree build unit 110 to reduce the complexity of the spatial partitioning structure S460. In one embodiment, controlling of the tree build unit 110 to reduce the complexity of the spatial partitioning structure may be performed by increasing the maximum primitive number or decreasing the tree depth. The tree build unit 110 may rebuild the tree structure of a dynamic scene under the control of the controller 130 S420.

Also, when the performance of the ray tracing unit 150 is lower than that of the tree build unit 110, the controller 130 may determine that the ray tracing unit 150 is heavily loaded and, to reduce the load of the ray tracing unit 150, may control the ray tracing unit 150 to lower the rendering quality S450. In one embodiment, controlling of the ray tracing unit 150 to lower the rendering quality may be performed by the first method related to reducing ray bounces, reducing the number of shootings of a shadow ray, reducing the number of lights, reducing the anti-aliasing level, and reducing the number of sampling applications per pixel; and by the second method related to the expansion of a gaze-sensitive area, expansion of a peripheral area, and an increase in a color difference. The ray tracing unit 150 may perform ray tracing based on the tree structures of static and dynamic scenes under the control of the controller 130 S430.

The S420 to S460 steps performed by the tree build unit 110, the controller 130, and the ray tracing unit 150 may be repeated until a 3D application is requested or terminated.

The ray tracing device 100 and ray tracing system 200 according to one embodiment may prevent shortages or waste of resources by monitoring a tree build unit (TBU) and a ray tracing unit (RTU) and selectively controlling operating performances of the corresponding units according to load conditions of the corresponding units.

Although the present disclosure has been described with reference to preferred embodiments given above, it should be understood by those skilled in the art that various modifications and variations of the present disclosure may be made without departing from the technical principles and scope specified by the appended claims below.

[Descriptions of symbols]

100: Ray tracing device
110: Tree build unit
130: Controller
150: Ray tracing unit
200: Ray tracing system

[Descriptions of symbols]

210: CPU
230: System memory
250: DRTX
270: External memory

The invention claimed is:

1. A ray tracing device with improved performance, the device comprising:
    a tree build processor configured to build a spatial partitioning structure;
    a ray tracing processor configured to perform ray tracing based on the spatial partitioning structure;
    a controller controlling the balance between operating performances of the tree build processor and the ray tracing processor adaptively by monitoring load conditions of the corresponding processors, wherein the controller generates a control parameter for adjusting the operating performance of at least one of the tree build processor and the ray tracing processor according to a comparison of loads of the tree build processor and the ray tracing processor.

2. The device of claim 1, wherein the load condition is determined based on a frame rate at which frames are processed in each of the corresponding processors.

3. The device of claim 1, wherein the spatial partitioning structure includes a bounding volume hierarchy (BVH) and a K-dimensional (KD) tree.

4. The device of claim 3, wherein the operating performance of the tree build processor changes according to the maximum primitive number of a leaf node and/or tree depth in the structure of the BVH or the KD tree.

5. The device of claim 1, wherein the operating performance of the ray tracing processor changes according to at least one of the ray bounces of ray tracing, the number of shootings of a shadow ray, the number of lights, the anti-aliasing level, and the number of samplings per pixel.

6. The device of claim 1, wherein, when the load of the ray tracing processor is greater than the load of the tree build processor, the controller controls the operating performance of the tree build processor to reduce the complexity of the spatial partitioning structure by increasing the maximum number of primitives and/or decreasing the tree depth.

7. The device of claim 1, wherein, when the load of the ray tracing processor is smaller than the load of the tree build processor, the controller controls the operating performance of the ray tracing processor to lower rendering quality.

8. The device of claim 7, wherein the controller generates the control parameter using a first parameter related to at least one of reducing ray bounces, reducing the number of shootings of a shadow ray, reducing the number of lights, reducing the anti-aliasing level, and
    reducing the number of samplings per pixel as a first method for lowering the rendering quality.

9. The device of claim 8, wherein the controller determines the total reduction amount according to a load difference between the corresponding processors;
    when a plurality of the first method are selected, the controller generates the first parameter by distributing the total reduction amount differently among the corresponding methods according to preset priorities.

10. The device of claim 7, wherein the controller generates the control parameter using a second parameter related to any one of expansion of a gaze-sensitive area, expansion of a peripheral area, and an increase in a color difference as a second method for lowering the rendering quality.

11. A ray tracing method with improved performance performed by a ray tracing device including a tree build processor, a ray tracing processor, and a controller, the method comprising:
- building a spatial partitioning structure by the tree build processor;
- performing ray tracing based on the spatial partitioning structure by the ray tracing processor; and
- controlling the balance between operating performances of the tree build processor and the ray tracing processor adaptively by monitoring load conditions of the corresponding processors by the controller, wherein the controller generates a control parameter for adjusting the operating performance of at least one of the tree build processor and the ray tracing processor according to a comparison of loads of the tree build processor and the ray tracing processor.

12. The method of claim 11, wherein the controlling includes checking a frame processing rate of the ray tracing processor;
- checking a frame processing rate of the tree build processor;
- calculating a frame rate per unit time from the number of frames processed by the ray tracing processor and the number of frames processed by the tree build processor; and
- determining the load conditions based on the calculated frame rate.

13. A ray tracing device with improved performance, the device comprising:
- a tree build processor configured to build a spatial partitioning structure;
- a ray tracing processor configured to perform ray tracing based on the spatial partitioning structure;
- a controller controlling the balance between operating performances of the tree build processor and the ray tracing processor adaptively by monitoring load conditions of the corresponding processors, wherein the operating performance of the ray tracing processor changes according to at least one of the ray bounces of ray tracing, the number of shootings of a shadow ray, the number of lights, the anti-aliasing level, and the number of samplings per pixel.

* * * * *